Figure 1:
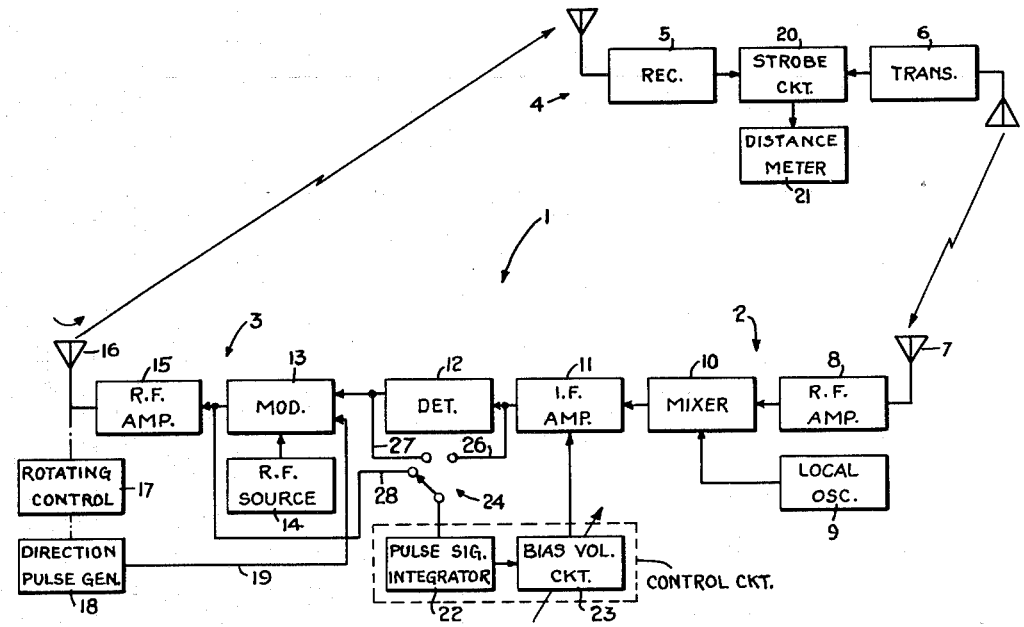

July 3, 1956 — S. H. M. DODINGTON — 2,753,553
DUTY CYCLE CONTROL FOR RADIO BEACONS
Filed March 15, 1952

INVENTOR
SVEN H. M. DODINGTON
BY
ATTORNEY

United States Patent Office 2,753,553
Patented July 3, 1956

2,753,553

DUTY CYCLE CONTROL FOR RADIO BEACONS

Sven H. M. Dodington, Nutley, N. J., assignor to International Telephone and Telegraph Corporation, a corporation of Maryland Application March 15, 1952, Serial No. 276,811

15 Claims. (Cl. 343—17.1)

This invention relates to radio beacons and more particularly to a responder type of beacon for assistance in making distance and azimuth measurements at an interrogating device.

Distance measuring interrogating systems provide means for an aircraft, for example, to determine its distance to a responding type of ground beacon. One type of distance measuring system in common use which provides continuous distance readings employs a transmitter and receiver as parts of the beacon and a transmitter and receiver in the aircraft. A distance measurement is initiated by having the craft's transmitter radiate coded interrogation pulses to be received by the beacon's receiver. The received signal actuates the beacon's transmitter which responds with pulses according to the craft's coded interrogation so that the craft's receiver may identify responses to its interrogations. The distance to the responder beacon is determined in the craft's receiver as a function of the time necessary to receive a response from the beacon.

Beacons heretofore used for distance measuring purposes usually have provisions for automatically preventing responses to an excessive number of interrogations. Such provisions are necessary in order to avoid overloading the beacon transmitter when a large number of craft are interrogating the beacon at the same time. This protection against overloading has in the past been achieved by preventing the beacon from responding to pulses which are spaced closer than a predetermined time interval. This placed a definite limit on the number of pulses to which the beacon could respond in a given period of time. In responder beacons heretofore used, it has also been necessary to carefully set the gain of the receiver so that the noise generated by the receiver does not result in an excessive number of spurious transmitted pulses which would overload the beacon's transmitter. This setting is extremely critical if good sensitivity is required and cannot, in fact, be done by purely manual means but must depend to some extent on an automatic noise or "grass" control of some sort. Further, the variable duty cycle of beacons heretofore known requires the use of fixed bias operation in substantially all the video amplifiers and modulators, necessitating bias supplies having fairly low impedance, and in addition, protection against failure of these bias supplies is necessary. Also, due to the varying duty cycle, the transmitter-oscillator temperature tends to fluctuate over a wide range causing frequency shifts if no automatic frequency control is used, or undue wear on the automatic frequency control mechanism if one is used.

The aircraft's distance measuring receiver for use with a variable duty cycle beacon receives a variable number of pulses per second and therefore cannot make use of a simple automatic gain control system. This complicates the design of the aircraft receiver.

One of the objects of this invention therefore is to provide a beacon which overcomes the aforementioned objections.

Another object of this invention is to provide a responder beacon in which the duty cycle is automatically maintained substantially constant.

A further object of this invention is to provide a responder beacon which can have a high pulse repetition frequency during search and a fairly low repetition frequency during tracking, and still further, which may also be used as an omnidirectional range beacon.

An important feature of this invention is the manner by which the duty cycle of the beacon is maintained substantially constant regardless of the absence or presence of interrogation signals. An amplifier of the beacon circuit or of the interrogation signal receiver associated therewith is provided with a gain control circuit which makes the amplifier sensitivity sufficiently high in the absence of interrogation signals as to supply enough thermal pulse noise to pulse modulate the R-F energy of the beacon transmitter for an average spurious operation equivalent to a desired constant duty cycle. The control circuit includes means to integrate the pulse signals received, taken either from the receiver circuit or from the transmitter circuit of the beacon to produce a bias voltage in accordance with the rate of occurrence of the received interrogation pulse signals. The bias voltage thus produced is applied to the amplifier to control the sensitivity thereof so as to change the amount of thermal pulse noise inversely proportional to the rate of occurrence of the interrogation pulse signals. Thus, as interrogation pulse signals are received at an increasing rate, a corresponding reduction is made of spurious pulse operation thereby resulting in a substantially constant duty cycle.

Figure 2:
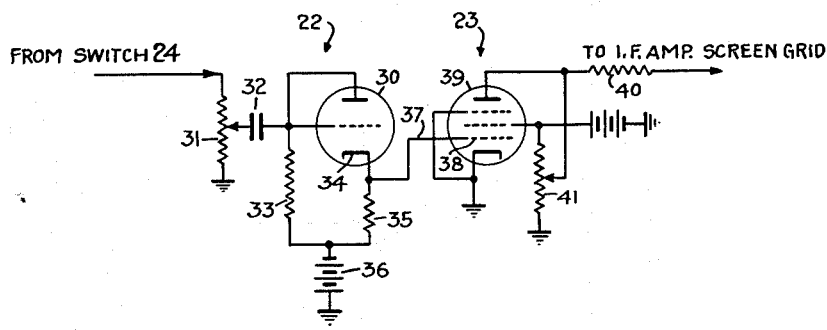

The above-mentioned and other features and objects of this invention will become more apparent and the invention itself will be best understood by reference to the following description taken in conjunction with the accompanying drawings, in which:

Fig. 1 shows block diagrams of a distance measuring system comprising a beacon and a beacon interrogating device for use on a craft, the location of which is to be determined with respect to such beacon; and Fig. 2 is a schematic circuit diagram of a control circuit for use in the beacon of Fig. 1.

Referring to Fig. 1, a typical distance measuring system is shown comprising a beacon 1 having a receiver 2 and a transmitter 3 and a mobile unit 4 including a receiver 5 and a transmitter 6, such as may be located on an aircraft or other vehicle. A distance measurement is obtained by transmission by transmitter 6 of interrogation pulse signals to which beacon 1 responds. The interrogation pulses are coded to identify the craft. When coded signals are received by the beacon antenna 7, they are fed to the usual receiver frequency converting circuits which include an R-F amplifier 8, a local oscillator 9, a mixer 10, an I-F amplifier 11 and a detector 12. The output of detector 12 triggers the modulator 13 of the beacon transmitter 3 to which is coupled R-F source 14. The pulsed R-F signal is fed through an R-F amplifier 15 to antenna 16 which preferably is of the type adapted to radiate an omnidirectional pattern distorted so as to provide a null in one direction. The antenna may be of the type requiring either mechanical or electronic rotation, the rotating control being represented at 17 to which is also coupled a direction pulse signal generator 18. The output of the generator 18 is applied over connection 19 to the modulator 13 for radiation of a coded pulse signal when the null is in a given direction. This directional signal provides for omnidirectional range use.

The mobile unit 4 is of a known form adapted for transmission of a coded interrogation pulse signal which when received by the beacon receiver 2 is applied therethrough to the modulator 13 of transmitter 3 for transmission over the beacon antenna 16. When the receiver 5 of the unit 4 receives this response, the signal is applied to a strobe circuit 20 to which is also applied a signal corresponding to the transmission of the interrogation pulse signal from transmitter 6 whereby the time interval between the interrogation pulse signal and the responder signal may be determined and the distance of the aircraft from the beacon indicated on meter 21.

In order for the beacon to supply signals at a desired constant duty cycle, which preferably is at a maximum or near maximum repetition rate, I provide for the control of the bias of one of the amplifiers such as amplifier 11, which is thereby automatically varied in accordance with the rate of reception of the interrogation pulse signals. This control circuit includes a pulse signal integrator 22 and a bias voltage circuit 23 for controlling the gain of I-F amplifier 11. The pulse signal integrator has an input switch 24 capable of connecting output energy from any one of a number of points in the beacon circuit, whichever is most suitable. As shown in Fig. 1, the switch 24 has three input connections, the first connection 26 leading from the output of I-F amplifier 11, a second connection 27 from the output of detector 12, and a third connection 28 from the output of modulator 13. By selectively connecting movable contact 29 with respect to these connections, the interrogation pulse signals may be integrated at 22 to produce a bias voltage for application through circuit 23 to the amplifier 11.

Referring to Fig. 2, the integrator 22 and the circuit 23 for applying bias to the amplifier are shown. The energy from switch 24 is applied to the grid-anode circuit of an electron discharge device 30 through a variable resistor 31 and a coupling condenser 32. The grid-anode circuit has connected thereto a resistor 33, and the cathode 34 has a resistor 35 connected to it. A source of negative voltage 36 is connected to a common point connecting resistors 33 and 35. An output connection 37 is connected to the cathode 34 and applied to the grid 38 of an electron discharge tube 39. The anode of the tube 39 is connected through a resistor 40 to one of the screen grids of the I-F amplifier 11 and also through a variable resistor 41 to a "B" supply. By adjusting the variable resistor 41, a desired adjustment can be made of the gain of amplifier 11 which in the present embodiment is to provide the amplifier with a high sensitivity such that it produces enough noise pulses to continually but spuriously trigger the modulator 13.

During operation of the beacon, the control circuit illustrated in Fig. 2 continues to supply a bias voltage such as to maintain the I-F amplifier at the desired sensitivity for spurious pulse operation of the transmitter 3 which when averaged over a few seconds is equal to an equivalent desired constant duty cycle. When an interrogation series of pulses is received, the pulses being slightly greater in amplitude than most of the noise pulses operate also to trigger the modulator for transmission operation. These additional pulse signals are integrated by the integrator 22 so that an output voltage over and above the average produced by the noise pulses is obtained over connection 37 which produces an increase flow in the electron discharge device 39. This increased flow corresponds directly to the rate of occurrence of the interrogation pulse signals and operates to reduce the sensitivity of the amplifier 11 a proportional amount thereby reducing the noise pulses generated thereby. This reduction of noise pulses is inversely proportional to the rate of occurrence of the pulse signals received. As more and more interrogation pulses are received from different craft, the bias voltage produced by the integrator 22 is increased proportionally thereby decreasing still further the sensitivity of amplifier 11. There is no critical adjustment of the amplifier 11, the only adjustment necessary is to turn up the gain of the amplifier to a level which assures sufficient pulse noise or "grass" for the average constant operation desired.

One of the advantages of the constant duty cycle beacon is that the pulse repetition frequency of interrogation pulses may be increased during the search for a beacon and then reduced, once response signals are received from a beacon. This stepping up of the frequency rate for search purposes might be argued as a disadvantage such as where the beacon may have a temporary fault thereby causing all aircraft to simultaneously start searching. It would thus be argued that the simultaneous searching at a high repetition rate would hopelessly overload the beacon, and no aircraft would receive service. The present system, however, is not subject to this disadvantage since any momentary beacon fault causing all aircraft to start searching simultaneously would cause the beacon sensitivity to decrease immediately. This decrease in sensitivity would render service only to those aircraft nearest the beacon which would have the strongest signals. Such aircraft would, therefore, continue to receive full service and their ranging circuit would again start tracking at a low repetition rate after an interval of five to fifteen seconds. When this tracking occurs, the beacon sensitivity would start to increase thereby extending its service to a larger area until full sensitivity is restored. It is estimated that this restoration would take less than one minute.

It has been determined by experiment that a desired high duty cycle can be maintained substantially constant for service to a variable number of aircraft interrogation units. The duty cycle remained substantially constant until the number of interrogation signals reached a certain saturation point beyond which the beacon receiver became less and less sensitive to additional interrogations.

Since the duty cycle of the beacon is constant, a simple AGC system in the aircraft distance measuring equipment will produce a voltage proportional to the average amplitude of the received pulses transmitted by the beacon, and this voltage will undergo a sharp dip in amplitude only when the null of the beacon antenna faces the aircraft. By radiating a coded train of pulses from generator 18 whenever the null faces a given direction such as north, the beacon becomes a suitable source for intelligence for determining azimuth.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio beacon comprising an R-F transmitter, a source of pulse signals, means responsive to pulse signals from said source for modulating the R-F amplifier of said transmitter, an amplifier for amplifying said pulse signals, the gain of said amplifier being adjustable to a sensitivity sufficient in the absence of pulse signals to supply thermal noise to pulse modulate the R-F energy of said transmitter for an average spurious operation equivalent to a desired constant duty cycle, means responsive to pulse signals from said source to produce a bias voltage in accordance with the rate of occurrence of said pulse signals, and means for applying said bias voltage to said amplifier to control the sensitivity thereof in a manner to produce a change in said thermal noise inversely proportional to the rate of occurrence of said pulse signals.

2. A radio beacon according to claim 1, wherein said source of pulse signals comprises a receiver associated with said transmitter for reception of interrogation pulses.

3. A radio beacon according to claim 2, wherein said amplifier is an amplifier in said receiver.

4. A radio beacon according to claim 2, wherein the means responsive to pulse signals includes means for integrating the signal output of said receiver.

5. A radio beacon according to claim 1, wherein the means responsive to pulse signals includes means for integrating the R-F output of said transmitter.

6. A radio beacon according to claim 5, wherein the means for integrating the R-F output of said transmitter includes means connecting said integrating means to the output of said modulating means.

7. A radio beacon according to claim 1, wherein the transmitter includes means for rotating a radiation pattern having a null, and the sourec of said pulse signals includes means for applying a predetermined pulse signal for transmission when said null is in a given direction.

8. A radio beacon according to claim 7, wherein said source of pulse signals also includes a receiver associated with said transmitter for reception of interrogation pulses.

9. A radio beacon according to claim 1, wherein the means responsive to pulse signals includes an electron discharge device having anode and cathode electrodes, means to apply energy of said pulse signals across said electrodes, said last named means including a first resistor connected to said anode, a second resistor connected to said cathode, and a source of negative voltage connected to said first and second resistors, and a voltage output circuit connected to said cathode electrode for output of said bias voltage.

10. A radio beacon according to claim 9, wherein the means to apply bias voltage to said amplifier includes an electron discharge device having anode, cathode, and grid electrodes, a resistor coupled to said anode for controlling the gain of said amplifier, and means coupling said voltage output circuit to said grid electrode.

11. A constant duty cycle circuit having an amplifier to which is coupled a source of pulse signals having random signal occurrence, the gain of said amplifier being adjustable to a sensitivity sufficient in the absence of pulse signals to supply thermal noise for average spurious operation of the circuit equivalent to a desired constant duty cycle, means responsive to pulse signals from said source to produce a bias voltage in accordance with the rate of occurrence of said pulse signals, and means for applying said bias voltage to said amplifier to control the sensitivity thereof in a manner to produce a change in said thermal noise inversely proportional to the rate of occurrence of said pulse signals.

12. A constant duty cycle circuit according to claim 11, wherein the means responsive to pulse signals includes means coupled to the input connection of said amplifier.

13. A constant duty cycle circuit according to claim 11, wherein the means responsive to pulse signals includes means coupled to the output of said amplifier.

14. A constant duty cycle circuit according to claim 11, wherein the means responsive to pulse signals includes an electron discharge device having anode and cathode electrodes, means to apply energy of said pulse signals across said electrodes, said last named means including a first resistor connected to said anode, a second resistor connected to said cathode, and a source of negative voltage connected to said first and second resistors, and a voltage output circuit connected to said cathode electrode for output of said bias voltage.

15. A constant duty cycle circuit according to claim 14, wherein the means to apply bias voltage to said amplifier includes an electron discharge device having anode, cathode, and grid electrodes, a resistor coupled to said anode for controlling the gain of said amplifier, and means coupling said voltage output circuit to said grid electrode.

References Cited in the file of this patent

UNITED STATES PATENTS

| 2,456,952 | Kluender | Dec. 21, 1948 |
| 2,513,282 | Busignies | July 4, 1950 |
| 2,594,916 | Gulnac | Apr. 29, 1952 |

FOREIGN PATENTS

| 968,654 | France | Dec. 1, 1950 |